US009460519B2

(12) United States Patent
    Pielawa

(10) Patent No.: US 9,460,519 B2
(45) Date of Patent: Oct. 4, 2016

(54) SEGMENTING A THREE DIMENSIONAL SURFACE MESH

(71) Applicant: Yowza LTD., Tel Aviv (IL)

(72) Inventor: Susanne Pielawa, Tel Aviv (IL)

(73) Assignee: YOWZA LTD., Tel Aviv (IL)

( * ) Notice: Subject to any disclaimer, the term of this patent is extended or adjusted under 35 U.S.C. 154(b) by 0 days.

(21) Appl. No.: 14/629,582

(22) Filed: Feb. 24, 2015

(65) Prior Publication Data

US 2016/0247289 A1 Aug. 25, 2016

(51) Int. Cl.
   *G06K 9/00* (2006.01)
   *G06T 7/00* (2006.01)
   *G06K 9/52* (2006.01)
   *G06K 9/46* (2006.01)

(52) U.S. Cl.
   CPC ............... *G06T 7/0079* (2013.01); *G06K 9/46* (2013.01); *G06K 9/52* (2013.01); *G06K 2009/4666* (2013.01)

(58) Field of Classification Search
   None
   See application file for complete search history.

(56) References Cited

U.S. PATENT DOCUMENTS

| 8,922,553 | B1* | 12/2014 | Tena ..................... G06T 17/00 345/419 |
| 2008/0123927 | A1* | 5/2008 | Miga ..................... A61B 19/52 382/131 |
| 2009/0174711 | A1* | 7/2009 | Lee ........................ G06T 17/20 345/420 |
| 2010/0290679 | A1* | 11/2010 | Gasser ..................... G06T 7/00 382/128 |
| 2011/0298799 | A1* | 12/2011 | Mariani ............. G06K 9/00221 345/420 |
| 2012/0143575 | A1* | 6/2012 | Imhof ..................... G01V 11/00 703/2 |
| 2015/0078641 | A1* | 3/2015 | Tan ....................... G06T 7/0083 382/131 |

OTHER PUBLICATIONS

Ronfard, Rémi, and Jarek Rossignac. "Full-range approximation of triangulated polyhedra." Computer Graphics Forum. vol. 15. No. 3. Blackwell Science Ltd, 1996.*

Amberg, Brian, Sami Romdhani, and Thomas Vetter. "Optimal step nonrigid icp algorithms for surface registration." Computer Vision and Pattern Recognition, 2007. CVPR'07. IEEE Conference on. IEEE, 2007.*

(Continued)

*Primary Examiner* — Li Liu
(74) *Attorney, Agent, or Firm* — Reches Patents

(57) ABSTRACT

A method that may include calculating multiple costs associated with multiple intermediate allocations and selecting an intermediate allocation of the multiple intermediate allocations in response to the multiple costs thereby providing a selected cut. The calculating may include repetitively executing the following steps: (a) Calculating an intermediate allocation of the multiple faces between to different intermediate parts of the mesh thereby defining an intermediate cut. The intermediate allocation differs from a previous intermediate allocation by a change in an allocation of at least one border face of the multiple faces. (b) Calculating, using a cost function, a cost of the intermediate allocation that is responsive to a length of the intermediate cut, and a difference between areas of the different intermediate parts. (c) Determining, based upon a comparison between a cost associated with the previous intermediate allocation and the cost of the intermediate allocation whether to accept the change in the allocation of the at least one border face.

19 Claims, 8 Drawing Sheets

(56) References Cited

OTHER PUBLICATIONS

Julius, Dan, Vladislav Kraevoy, and Alla Sheffer. "D-Charts: Quasi-Developable Mesh Segmentation." Computer Graphics Forum. vol. 24. No. 3. Blackwell Publishing, Inc, 2005.*

Dyn, Nira, et al. "Optimizing 3D triangulations using discrete curvature analysis." Mathematical methods for curves and surfaces 28.5 (2001): 135-146.*

* cited by examiner

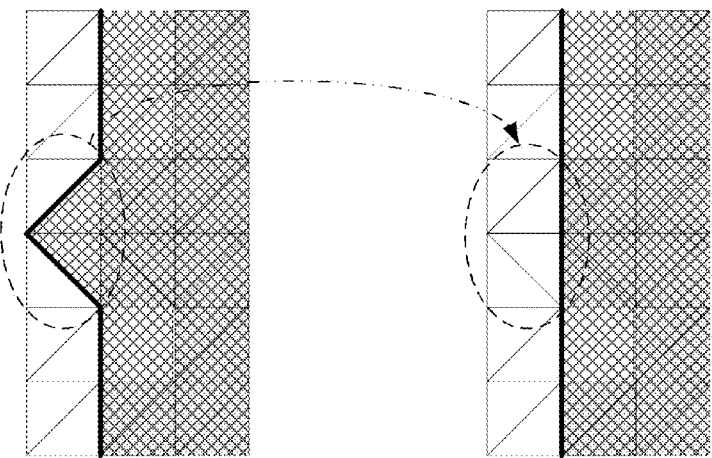
41    42
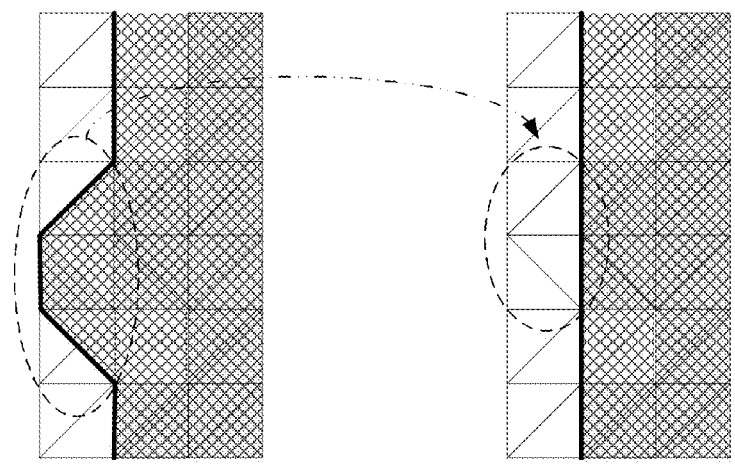
44    45
FIG. 3

Receiving or generating a mesh, wherein the mesh is a three dimensional surface mesh that comprises multiple faces and represents a three dimensional object. 510

Finding a first cut that segments the mesh to a first part and a second part. 520

Calculating, by applying a cost function, multiple costs associated with multiple intermediate cuts that result from multiple different allocations of faces of a set of faces of the mesh to multiple intermediate first and second parts. A cost of a certain intermediate cut that represents a certain allocation of faces between certain intermediate first and second parts is responsive to (a) a length of the certain intermediate cut, and (b) a difference between areas of the first and second intermediate parts. 522

Selecting the first cut in response to values of the multiple costs. 524

Receiving or generating a mesh, wherein the mesh is a three dimensional surface mesh that comprises multiple faces and represents a three dimensional object. 610

Calculating multiple costs associated with multiple intermediate allocations; wherein the multiple costs are calculated by applying a cost function; wherein each intermediate allocation is defined by an intermediate cut that segments the mesh to multiple segments; wherein the cost of each intermediate allocation is responsive to a product of a length of an intermediate cut defined by the intermediate allocation and to a sum of a reciprocal of an area of a first intermediate part defined by the intermediate allocation and a reciprocal of an area of the second intermediate part first intermediate part defined by the intermediate allocation. 620

Selecting an intermediate allocation of the multiple intermediate allocations that has a best cost thereby providing a selected cut. 630

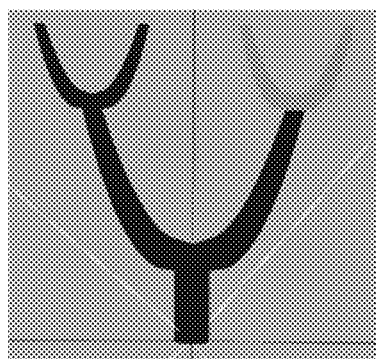
810
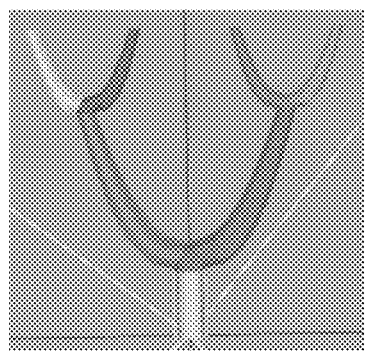
820
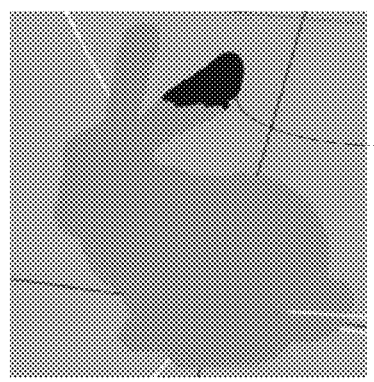
831
830
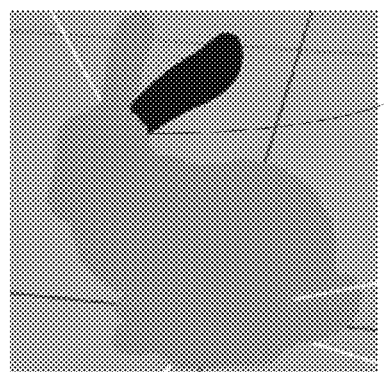
841
840
FIG. 8

SEGMENTING A THREE DIMENSIONAL SURFACE MESH

BACKGROUND OF THE INVENTION

Three dimensional objects may be represented by a three dimensional surface mesh that includes a plurality of faces.

There is a growing need to segment the three dimensional surface mesh to meaningful parts.

SUMMARY

There may be provided a computer implemented method that may include: receiving or generating a mesh, wherein the mesh may be a three dimensional surface mesh that may include multiple faces and represents a three dimensional object; calculating multiple costs associated with multiple intermediate allocations; and selecting an intermediate allocation of the multiple intermediate allocations in response to the multiple costs thereby providing a selected cut. The calculating of the multiple costs may include repetitively executing the following steps: (i) calculating an intermediate allocation of the multiple faces between to different intermediate parts of the mesh thereby defining an intermediate cut; wherein the intermediate allocation differs from a previous intermediate allocation by a change in an allocation of at least one border face of the multiple faces; (ii) calculating, using a cost function, a cost of the intermediate allocation; wherein the cost of the intermediate cut may be responsive to a length of the intermediate cut, and a difference between areas of the different intermediate parts; and (iii) determining, based upon a comparison between a cost associated with the previous intermediate allocation and the cost of the intermediate allocation whether to accept the change in the allocation of the at least one border face.

There may be provided a computer that comprises a processor that is configured to receive or generate a mesh, wherein the mesh may be a three dimensional surface mesh that may include multiple faces and represents a three dimensional object; calculate multiple costs associated with multiple intermediate allocations; and select an intermediate allocation of the multiple intermediate allocations in response to the multiple costs thereby providing a selected cut. The calculating of the multiple costs may include repetitively executing, by the processor, the following steps: (i) calculating an intermediate allocation of the multiple faces between to different intermediate parts of the mesh thereby defining an intermediate cut; wherein the intermediate allocation differs from a previous intermediate allocation by a change in an allocation of at least one border face of the multiple faces; (ii) calculating, using a cost function, a cost of the intermediate allocation; wherein the cost of the intermediate cut may be responsive to a length of the intermediate cut, and a difference between areas of the different intermediate parts; and (iii) determining, based upon a comparison between a cost associated with the previous intermediate allocation and the cost of the intermediate allocation whether to accept the change in the allocation of the at least one border face There may be provided a non-transitory computer readable medium that may store instructions that once executed by the computer may cause the computer to execute the stages of: receiving or generating a mesh, wherein the mesh may be a three dimensional surface mesh that may include multiple faces and represents a three dimensional object; calculating multiple costs associated with multiple intermediate allocations; and selecting an intermediate allocation of the multiple intermediate allocations in response to the multiple costs thereby providing a selected cut. The calculating of the multiple costs may include repetitively executing the following steps: (i) calculating an intermediate allocation of the multiple faces between to different intermediate parts of the mesh thereby defining an intermediate cut; wherein the intermediate allocation differs from a previous intermediate allocation by a change in an allocation of at least one border face of the multiple faces; (ii) calculating, using a cost function, a cost of the intermediate allocation; wherein the cost of the intermediate cut may be responsive to a length of the intermediate cut, and a difference between areas of the different intermediate parts; and (iii) determining, based upon a comparison between a cost associated with the previous intermediate allocation and the cost of the intermediate allocation whether to accept the change in the allocation of the at least one border face.

The non-transitory computer readable medium may store instructions for selecting of the intermediate allocation by selecting the intermediate allocation of faces that are associated with a best cost out of the multiple costs.

The cost of each intermediate allocation may be responsive to (a) a length of an intermediate cut defined by the intermediate allocation and (b) a sum of a reciprocal of an may be a of a first intermediate part defined by the intermediate allocation and a reciprocal of an may be a of the second intermediate part first intermediate part defined by the intermediate allocation.

The cost of each intermediate allocation may be proportional to a product of a multiplication between (a) the length of the intermediate cut defined by the intermediate allocation and (b) a square root the sum of the reciprocal of the may be a of the first intermediate part defined by the intermediate allocation and the reciprocal of the may be a of the second intermediate part defined by the intermediate allocation.

The non-transitory computer readable medium may store instructions for accepting a change in a certain intermediate allocation of at least one border face only when the change may be beneficial.

The non-transitory computer readable medium may store instructions for accepting a change in a certain intermediate allocation of at least one border face when the change may be beneficial and when the change may be disadvantageous below a disadvantage threshold.

The non-transitory computer readable medium may store instructions for applying a probabilistic process for accepting a change in a certain intermediate allocation of at least one border face when the change may be disadvantageous.

The non-transitory computer readable medium may store instructions for reducing a probability of success in the probabilistic process over time.

The non-transitory computer readable medium may store instructions for stopping the calculation of the multiple costs when all changes in allocations of border faces may be rejected.

At least one intermediate allocation may be calculated by changing an allocation of only a single border face of a corresponding previous intermediate allocation.

At least one intermediate allocation may be calculated by changing an allocation of a plurality of border faces of a corresponding previous intermediate allocation.

At least one intermediate allocation may be calculated by changing an allocation of only a single border face of a corresponding previous intermediate allocation; and wherein at least one other intermediate allocation may be calculated by changing an allocation of a plurality of border faces of a corresponding previous intermediate allocation.

The calculating of the multiple costs may include a first phase and a second phase that follows the first phase; wherein during the first phase each intermediate allocation may be calculated by changing an allocation of only a single border face of a corresponding previous intermediate allocation; and wherein during the second phase each intermediate allocation may be calculated by changing an allocation of a plurality of border faces of a corresponding previous intermediate allocation.

The selected cut may define multiple selected parts. The non-transitory computer readable medium may store instructions for segmenting a selected part by calculating multiple costs associated with multiple intermediate allocations of the selected part; and selecting an intermediate allocation of selected part out of the multiple intermediate allocations of the selected part in response to the multiple costs thereby providing an additional selected cut.

There may be provided a method that may include receiving or generating a mesh, wherein the mesh may be a three dimensional surface mesh that may include multiple faces and represents a three dimensional object; and finding a first cut that segments the mesh to a first part and a second part; wherein the finding of the first cut may include applying an iterative process that may include: calculating, by applying a cost function, multiple costs associated with multiple intermediate cuts that result from multiple different allocations of faces of a set of faces of the mesh to multiple intermediate first and second parts; and selecting the first cut in response to values of the multiple costs; wherein a cost of a certain intermediate cut that represents a certain allocation of faces between certain intermediate first and second parts may be responsive to (a) a length of the certain intermediate cut, and (b) a difference between areas of the first and second intermediate parts.

There may be provided a computer that includes a processor that may be configured to receive or generate a mesh, wherein the mesh may be a three dimensional surface mesh that may include multiple faces and represents a three dimensional object. Find a first cut that segments the mesh to a first part and a second part. The finding of the first cut may include applying, by the processor, an iterative process that may include: calculating, by applying a cost function, multiple costs associated with multiple intermediate cuts that result from multiple different allocations of faces of a set of faces of the mesh to multiple intermediate first and second parts; and selecting the first cut in response to values of the multiple costs; wherein a cost of a certain intermediate cut that represents a certain allocation of faces between certain intermediate first and second parts may be responsive to (a) a length of the certain intermediate cut, and (b) a difference between areas of the first and second intermediate parts.

There may be provided a non-transitory computer readable medium that may store instructions that once executed by a computer cause the computer to execute the stages of: receiving or generating a mesh, wherein the mesh may be a three dimensional surface mesh that may include multiple faces and represents a three dimensional object; and finding a first cut that segments the mesh to a first part and a second part; wherein the finding of the first cut may include applying an iterative process that may include: calculating, by applying a cost function, multiple costs associated with multiple intermediate cuts that result from multiple different allocations of faces of a set of faces of the mesh to multiple intermediate first and second parts; and selecting the first cut in response to values of the multiple costs; wherein a cost of a certain intermediate cut that represents a certain allocation of faces between certain intermediate first and second parts may be responsive to (a) a length of the certain intermediate cut, and (b) a difference between areas of the first and second intermediate parts.

The selecting of the first cut may include selecting the certain allocation of faces that provides a best cost out of the multiple costs.

The cost of the certain intermediate cut may be responsive to (a) the length of the certain intermediate cut and (b) a sum of a reciprocal of the may be a of the first intermediate part and a reciprocal of the may be a of the second intermediate part.

The cost of the certain intermediate cut may be proportional to a product of a multiplication between (a) the length of the certain intermediate cut and (b) a square root the sum of the reciprocal of the may be a of the first intermediate part and the reciprocal of the may be a of the second intermediate part.

There may be provided a non-transitory computer readable medium that may store instructions that once executed by a computer cause the computer to execute the stages of: receiving or generating a mesh, wherein the mesh may be a three dimensional surface mesh that may include multiple faces and represents a three dimensional object; calculating multiple costs associated with multiple intermediate allocations; wherein the multiple costs may be calculated by applying a cost function; wherein each intermediate allocation may be defined by an intermediate cut that segments the mesh to multiple segments; wherein the cost of each intermediate allocation may be responsive to a product of a length of an intermediate cut defined by the intermediate allocation and to a sum of a reciprocal of an may be a of a first intermediate part defined by the intermediate allocation and a reciprocal of an may be a of the second intermediate part first intermediate part defined by the intermediate allocation; and selecting an intermediate allocation of the multiple intermediate allocations that has a best cost thereby providing a selected cut.

There may be provided a computer implemented method that may include receiving or generating a mesh, wherein the mesh may be a three dimensional surface mesh that may include multiple faces and represents a three dimensional object; calculating multiple costs associated with multiple intermediate allocations; wherein the multiple costs may be calculated by applying a cost function; wherein each intermediate allocation may be defined by an intermediate cut that segments the mesh to multiple segments; wherein the cost of each intermediate allocation may be responsive to a product of a length of an intermediate cut defined by the intermediate allocation and to a sum of a reciprocal of an may be a of a first intermediate part defined by the intermediate allocation and a reciprocal of an may be a of the second intermediate part first intermediate part defined by the intermediate allocation; and selecting an intermediate allocation of the multiple intermediate allocations that has a best cost thereby providing a selected cut.

There may be provided a computer that comprises a processor that is configured to receive or generate a mesh, wherein the mesh may be a three dimensional surface mesh that may include multiple faces and represents a three dimensional object; calculate multiple costs associated with multiple intermediate allocations; wherein the multiple costs may be calculated by applying a cost function. Each intermediate allocation may be defined by an intermediate cut that segments the mesh to multiple segments. The cost of each intermediate allocation may be responsive to a product of a length of an intermediate cut defined by the intermediate allocation and to a sum of a reciprocal of an may be a of a first intermediate part defined by the intermediate allocation and a reciprocal of an may be a of the second intermediate part first intermediate part defined by the intermediate allocation. Select an intermediate allocation of the multiple intermediate allocations that has a best cost thereby providing a selected cut.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 3 illustrates multiple intermediate allocations of a portion of a mesh a method according to an embodiment of the invention;

FIG. 5 illustrates a method according to an embodiment of the invention;

FIG. 6 illustrates a method according to an embodiment of the invention;

FIG. 8 illustrates multiple cuts according to various embodiments of the invention.

DETAILED DESCRIPTION OF THE DRAWINGS

Figure 1:
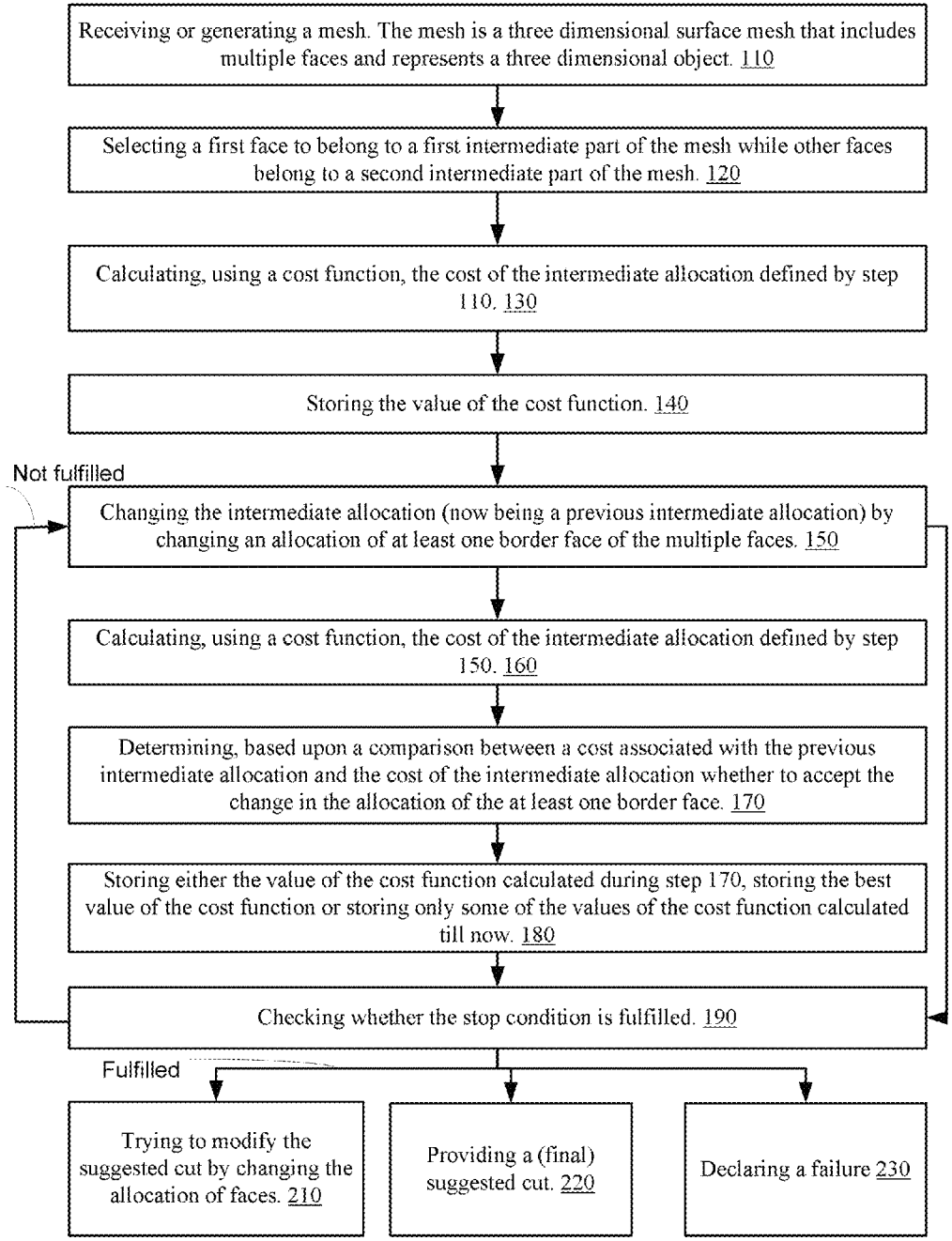
FIG. 1 illustrates a method according to an embodiment of the invention.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a system capable of executing the method and should be applied mutatis mutandis to a non-transitory computer readable medium that stores instructions that once executed by a computer result in the execution of the method.

Any reference in the specification to a system should be applied mutatis mutandis to a method that may be executed by the system and should be applied mutatis mutandis to a non-transitory computer readable medium that stores instructions that may be executed by the system.

Any reference in the specification to a non-transitory computer readable medium should be applied mutatis mutandis to a system capable of executing the instructions stored in the non-transitory computer readable medium and should be applied mutatis mutandis to method that may be executed by a computer that reads the instructions stored in the non-transitory computer readable medium.

FIG. 1 illustrates method 100 for segmenting a three dimensional surface mesh.

Method 100 may start by step 110 of receiving or generating a mesh. The mesh is a three dimensional surface mesh that includes multiple faces and represents a three dimensional object. The faces may be of any shape and size. For example they may be triangles or any other polygon. A mesh may include faces of the same shape. Alternatively, at least one face of the mesh may differ by shape from another face of the mesh.

For simplicity of explanation it is assumed that the faces are triangles, that the segmentation is binary (partitions are made to two parts at a time).

Step 110 may be followed by step 120 of selecting a first face to belong to a first intermediate part of the mesh while other faces belong to a second intermediate part of the mesh. The parts are termed "intermediate" because they may change during the execution of method 100.

Step 120 defined a first intermediate allocation of the mesh. The arcs of the first face define the first intermediate cut that separates the first intermediate part from the second intermediate part.

Step 120 may be followed by step 130 of calculating, using a cost function, the cost of the intermediate allocation defined by step 110.

The cost function may be responsive to the length (L) of the intermediate cut and to the difference between the area (A1) of the first intermediate part (the first face) and the area (A2) of the second intermediate part (includes all the faces except the first face).

According to an embodiment of the invention the cost function may be responsive to length (L), and to a sum of a reciprocal of A1 and to a sum of a reciprocal of A2 (1/A1+1/A2).

According to an embodiment of the invention the cost function equals $L*SQR(1/A1+1/A2)$, wherein SQR is a square root function.

Step 130 may be followed by step 140 of storing the value of the cost function.

Figure 2:
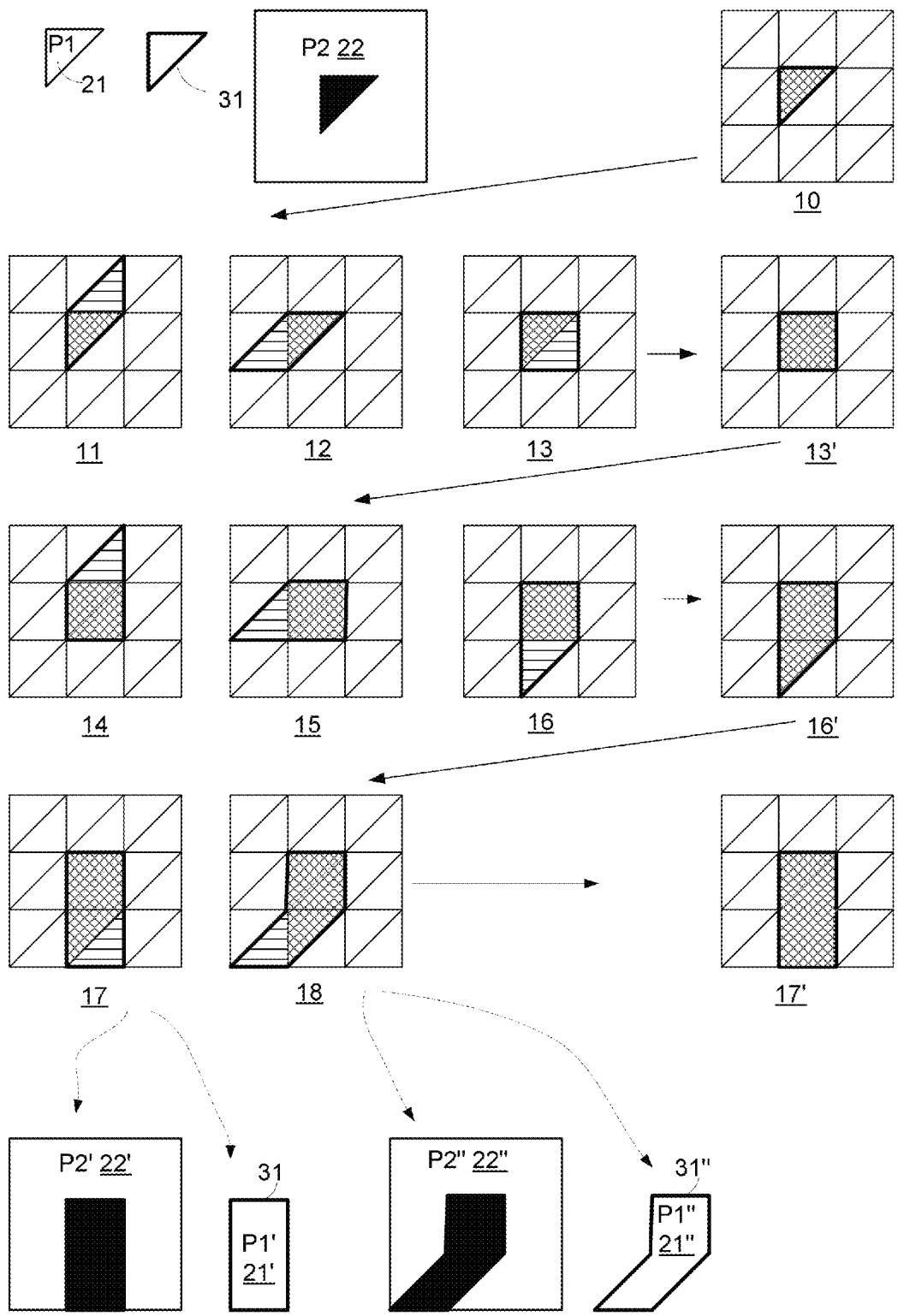
FIG. 2 illustrates multiple intermediate allocations of a portion of a mesh a method according to an embodiment of the invention.

Referring to FIG. 2—a portion 10 of a mesh is initially segmented to a first intermediate part P1 21 (single face) and to a second intermediate part P2 22 (entire portion 10 except the single face), the intermediate cut 31 includes the arcs of the first intermediate part 21.

Step 140 is followed by a sequence of steps that are repeated (while examining new intermediate allocations of faces) until a stop condition is fulfilled.

Step 140 may be followed by step 150 of changing the intermediate allocation (now being a previous intermediate allocation) by changing an allocation of at least one border face of the multiple faces. A border face is a face that one of its arcs is included in the intermediate cut.

Step 150 may be followed by step 160 of calculating, using a cost function, the cost of the intermediate allocation defined by step 150.

Referring to FIG. 2—portions 11, 12 and 13 may represent a flipping of three different faces (in relation to portion 10)—one face at a time—to provide three different intermediate allocations that are evaluated.

Step 160 may be followed by step 170 of determining, based upon a comparison between a cost associated with the previous intermediate allocation and the cost of the intermediate allocation whether to accept the change in the allocation of the at least one border face.

The determination may include at least one of the following:
- a. Accepting the change in the allocation only if the change is beneficial. For example—it reduced the value of the cost function.
- b. Accepting the change in the allocation only if the change is beneficial by at least a predefined difference.
- c. Accepting the change in allocation if the change is beneficial or if the change is disadvantageous—but below a disadvantage threshold. The disadvantage threshold may be fixed, may change over time, may be responsive to previous values of the cost function, and the like.
- d. Accepting the change in allocation by applying a probabilistic process for accepting a change in a certain intermediate allocation of at least one border face when the change is disadvantageous. The probability of acceptance is a function of two variables, the cost before the change and the cost after the change. According to an embodiment of the invention the function for the probability of success may be fixed, may change over time, may be responsive to values of one or more costs calculated by applying the cost function. For example—the chances of success may reduce over time. This may allow the process to overcome problematic allocation at the beginning of the iterations while allowing the process to converge at the end of the process.

According to an embodiment of the invention the probabilistic process defines an acceptance probability P that may be responsive to a temperature variable and to the disadvantage in selecting a new intermediate allocation. The temperature variable T may change over time.

For example P may equal e by the power of −Delta/T, wherein Delta is the difference between the cost of a new intermediate allocation and the cost of the previous intermediate allocation. For example and referring to FIG. 2—Delta may be the difference in the cost of portion 10 versus the cost of any one of portions 11, 12 and 13.

As indicated above—the costs of each one of portions 11, 12 and 13 may be compared to the cost of portion 10 in order to determine whether to accept anyone of these (new) intermediate partitions. In FIG. 2 portion 13 received the best score and is elected as the new intermediate partition (13').

As illustrated in FIG. 2—this iterative process continues multiple times.
- a. For example—the intermediate allocation that defined portion 13' is modified to provide portions 14, 15 and 16, these portions are compared to portion 13' —and portion 16 is elected as the new intermediate portion (16').
- b. Yet for another example—the intermediate allocation that defined portion 16' is modified to provide portions 17 and 18, these portions are compared to portion 16' —and portion 17 is elected as the new intermediate portion (17').

FIG. 2 also illustrates:
- a. The intermediate cut 31' (of length L'), the first intermediate part P1' 21' (of area A1') and the second intermediate part 22' (of area A2') associated with portion 17.
- b. The intermediate cut 31" (of length L"), the first intermediate part P1" 21" (of area A1") and the second intermediate part 22" (of area A2") associated with portion 18.

The selection of portion 17 may imply that L'*SQR(1/A1'+1/A2') is smaller than L"*SQR(1/A1"+1/A2").

Step 170 may be followed by step 180 of storing either the value of the cost function calculated during step 170, storing the best value of the cost function or storing only some of the values of the cost function calculated till now.

Step 180 may be followed by step 190 of checking whether the stop condition is fulfilled. A stop condition may be fulfilled if at least one of the following occurs:
- a. The number of iterations of steps 150-190 reaches a predefined maximal number.
- b. The mesh has been successfully segmented.
- c. Method 100 is stuck—it cannot add any additional border faces.

If the stop condition is fulfilled then step 190 may be followed (depending upon the stop condition) by steps 210, 220 or 230.

If the stop condition is not fulfilled step 190 may be followed by step 140.

According to an embodiment of the invention step 210 may include performing local improvements. Step 210 may be followed by step 220.

Steps 110-190 may be regarded as a first phase of method 100 while step 210 may be regarded as a second phase of method 100.

According to an embodiment of the invention during the first phase each intermediate allocation is calculated by changing an allocation of only a single border face of a corresponding previous intermediate allocation. During the second phase each intermediate allocation is calculated by changing an allocation of a plurality of border faces of a corresponding previous intermediate allocation.

Step 210 may include trying to modify the suggested cut by changing the allocation of faces—for example by flipping one or more border faces from one part to the other. The modification may involve flipping one face at a time of multiple faces at a time—as illustrated in FIG. 3—portion 41 is modified by flipping two faces to provide portion 42 and portion 44 is modified by flipping three faces to provide portion 45.

The changes in allocation (of step 210) may differ from those of step 150 by the number of faces that are flipped per iteration.

Step 220 may include providing a (final) suggested cut. This may be the best cut that was evaluated—the cut that is associated with the best cost. For example—when using a cost function of L*SQR(1/A1+1/A2)—then the cut with the lowest cost is selected.

Step 230 may include declaring a failure, and jumping to step 110 in order to select a new first face. Any selection of the first face may be done in a random manner, in a pseudo random manner, in response to the location of a previously selected first part and the like.

Once an iteration of method is completed the three dimensional surface mesh is segmented to two parts. Method 100 may be applied on any one of the parts and on any one of the parts that are defined during any other iteration of method 100.

Method 100 uses a cost function that aims to minimize the length of the cutting curve (L) while at the same time avoiding parts with small area (in comparison to other parts), making it resistant to noise.

The execution of steps 110-160 provides an efficient scheme of finding a good first guess and it selects the best configuration and not merely the last configuration.

Method 100 is fast, especially when using the probability process, and does not try to compute the entire energy landscape of each possible cut of the mash.

Using the cost function of L*SQR(1/A1+1/A2) was found to lead to a natural-looking segmentation of the mesh.

Figure 4:
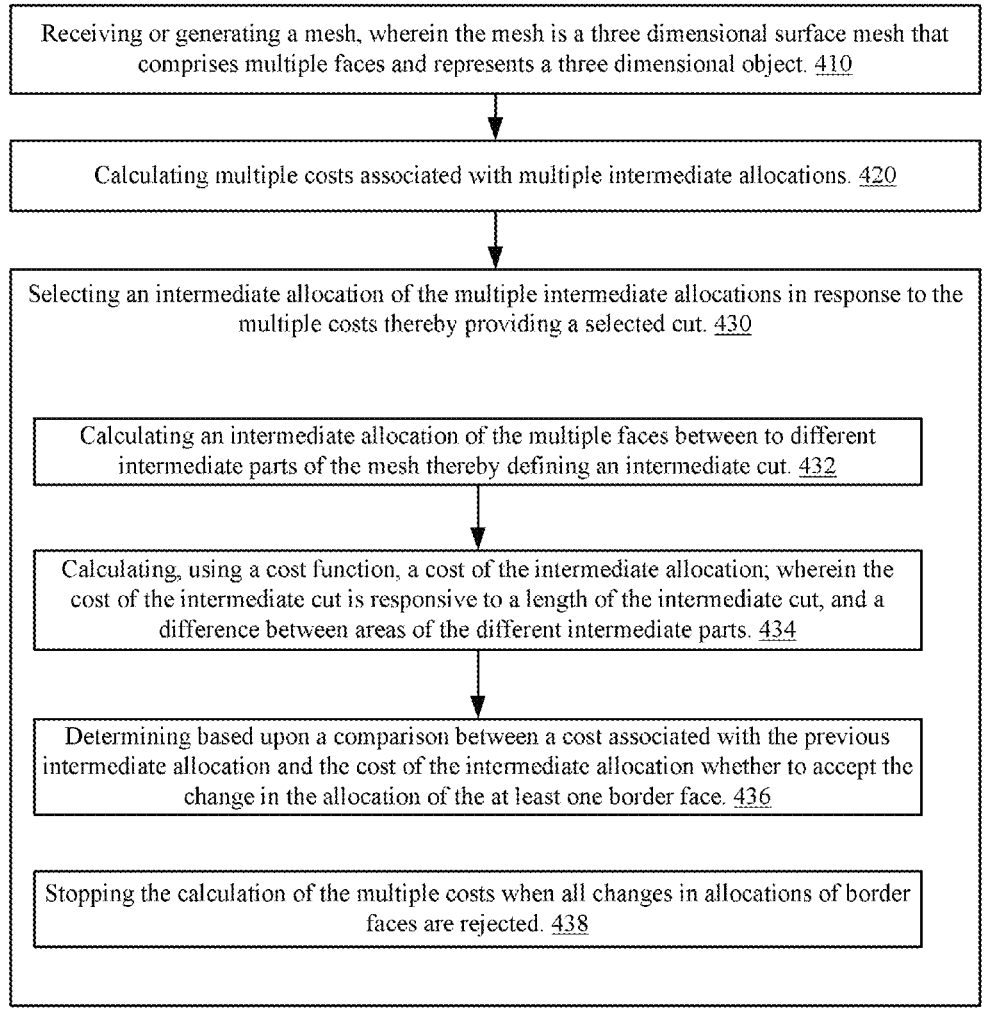
FIG. 4 illustrates a method according to an embodiment of the invention.

FIG. 4 illustrates method 400 according to an embodiment of the invention.

Method 400 may start by step 410 of receiving or generating a mesh, wherein the mesh is a three dimensional surface mesh that comprises multiple faces and represents a three dimensional object.

Step 410 may be followed by step 420 of calculating multiple costs associated with multiple intermediate allocations. Method 100 provides a non-limiting example of calculations of multiple intermediate allocations (see, for example FIGS. 1 and 2 illustrating multiple intermediate allocations of a portion of the mesh).

Step 420 may be followed by step 430 of selecting an intermediate allocation of the multiple intermediate allocations in response to the multiple costs thereby providing a selected cut.

Step 430 of calculating of the multiple costs may include repetitively executing the following steps:
 a. Calculating (432) an intermediate allocation of the multiple faces between to different intermediate parts of the mesh thereby defining an intermediate cut. The intermediate allocation differs from a previous intermediate allocation by a change in an allocation of at least one border face of the multiple faces.
 b. Calculating (434), using a cost function, a cost of the intermediate allocation; wherein the cost of the intermediate cut is responsive to a length of the intermediate cut, and a difference between areas of the different intermediate parts.
 c. Determining (436), based upon a comparison between a cost associated with the previous intermediate allocation and the cost of the intermediate allocation whether to accept the change in the allocation of the at least one border face.

Step 430 may include selecting the intermediate allocation of faces that is associated with a best cost out of the multiple costs. It is noted that the selection may include selecting a sub-optimal intermediate allocation—an intermediate allocation that does not provide the best cost.

The cost of each intermediate allocation may be responsive to (a) a length of an intermediate cut defined by the intermediate allocation and (b) a sum of a reciprocal of an area of a first intermediate part defined by the intermediate allocation and a reciprocal of an area of the second intermediate part first intermediate part defined by the intermediate allocation.

The cost of each intermediate allocation may be proportional to a product of a multiplication between (a) the length of the intermediate cut defined by the intermediate allocation and (b) a square root the sum of the reciprocal of the area of the first intermediate part defined by the intermediate allocation and the reciprocal of the area of the second intermediate part defined by the intermediate allocation.

The cost may be responsive to an outcome of any function applied on any attribute (such as a length) of the intermediate cut defined by the intermediate allocation, and on area of the first and second intermediate parts. For example it may be responsive to an outcome of any function on the length of the intermediate cut, on the area of the first intermediate part defined by the intermediate allocation and on the area of the second intermediate part defined by the intermediate allocation Step 436 of determining may include at least one out of:
 a. Accepting a change in a certain intermediate allocation of at least one border face only when the change is beneficial.
 b. Accepting a change in a certain intermediate allocation of at least one border face when the change is beneficial and when the change is disadvantageous below a disadvantage threshold.
 c. Applying a probabilistic process for accepting a change in a certain intermediate allocation of at least one border face when the change is disadvantageous.
 d. Applying a probabilistic process for accepting a change in a certain intermediate allocation of at least one border face when the change is disadvantageous while reducing a probability of success in the probabilistic process over time.

Step 430 may include step 438 of stopping the calculation of the multiple costs when all changes in allocations of border faces are rejected.

Step 432 may include at least one out of the following:
 a. Calculating at least one intermediate allocation by changing an allocation of only a single border face of a corresponding previous intermediate allocation.
 b. Calculating at least one intermediate allocation by changing an allocation of a plurality of border faces of a corresponding previous intermediate allocation.
 c. Calculating at least one intermediate allocation by changing an allocation of only a single border face of a corresponding previous intermediate allocation; calculating at least one other intermediate allocation by changing an allocation of a plurality of border faces of a corresponding previous intermediate allocation.
 d. Calculating each intermediate allocation, during a first phase of method 400, by changing an allocation of only a single border face of a corresponding previous intermediate allocation; calculating, during a second phase of method 400 that follows the first phase, each intermediate allocation by changing an allocation of a plurality of border faces of a corresponding previous intermediate allocation.

Once a single iteration of method 400 ends and segments the mesh (or a part of the mesh) to multiple parts, method 400 can be applied on one of the multiple parts.

FIG. 5 illustrates method 500 according to an embodiment of the invention.

Method 500 may start by step 510 of receiving or generating a mesh, wherein the mesh is a three dimensional surface mesh that comprises multiple faces and represents a three dimensional object.

Step 510 may be followed by step 520 of finding a first cut that segments the mesh to a first part and a second part. Referring to methods 100 and 400—a first iteration of these methods provides a first cut.

Step 520 may include applying an iterative process that includes a. Calculating (522), by applying a cost function, multiple costs associated with multiple intermediate cuts that result from multiple different allocations of faces of a set of faces of the mesh to multiple intermediate first and second parts. A cost of a certain intermediate cut that represents a certain allocation of faces between certain intermediate first and second parts is responsive to (a) a length of the certain intermediate cut, and (b) a difference between areas of the first and second intermediate parts.

b. Selecting (524) the first cut in response to values of the multiple costs.

Step 524 may include selecting the certain allocation of faces that provides a best cost out of the multiple costs. A selection of a sub-optimal cut may be provided.

The cost of a certain intermediate cut may be responsive to (a) the length of the certain intermediate cut and (b) a sum of a reciprocal of the area of the first intermediate part and a reciprocal of the area of the second intermediate part.

The cost of a certain intermediate cut may be proportional to a product of a multiplication between (a) the length of the certain intermediate cut and (b) a square root the sum of the reciprocal of the area of the first intermediate part and the reciprocal of the area of the second intermediate part.

FIG. 6 illustrates method 600 according to an embodiment of the invention.

Method 600 may start by step 610 of receiving or generating a mesh, wherein the mesh is a three dimensional surface mesh that comprises multiple faces and represents a three dimensional object.

Step 610 may be followed by step 620 of calculating multiple costs associated with multiple intermediate allocations; wherein the multiple costs are calculated by applying a cost function; wherein each intermediate allocation is defined by an intermediate cut that segments the mesh to multiple segments; wherein the cost of each intermediate allocation is responsive to a product of a length of an intermediate cut defined by the intermediate allocation and to a sum of a reciprocal of an area of a first intermediate part defined by the intermediate allocation and a reciprocal of an area of the second intermediate part first intermediate part defined by the intermediate allocation.

Step 620 may include applying method 100, 400 and even 500. Alternatively, method 600 may include applying any other steps using the cost function of step 620. These steps may be iterative or non-iterative. The selection of the multiple intermediate allocations can be made in a random manner, pseudo random manner, in response to values of the cost function, and the like.

Step 620 may be followed by step 630 of selecting an intermediate allocation of the multiple intermediate allocations that has a best cost thereby providing a selected cut.

Figure 7:
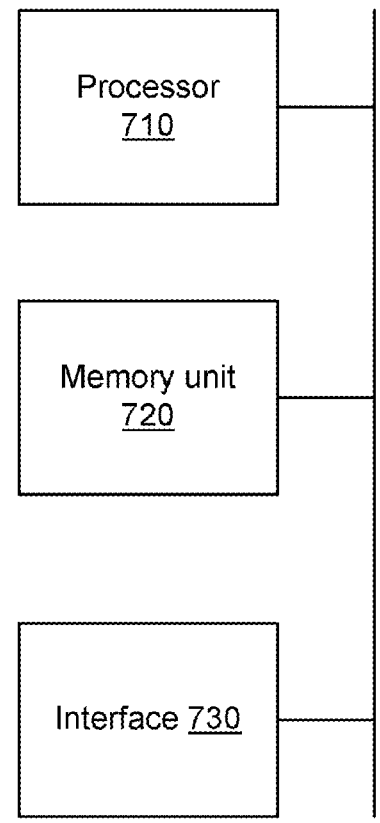
FIG. 7 illustrates a system according to an embodiment of the invention.

FIG. 7 illustrates a system 700 according to an embodiment of the invention.

System 700 may be one or more computers. System 700 may include, for example, a hardware processor 710, a memory unit 720 and an interface 730 for coupling the system 700 to one or more networks (not shown).

The hardware processor 710 may be a digital signal processor, a central processing unit, an FPGA, a tailored processor and the like. The memory unit 720 may be a volatile memory, a non-volatile memory or a combination of both.

System 700 may be configured to execute any one of methods 100, 400, 500 and 600 or any combination of any steps of these methods. The memory unit 720 may store instructions that once executed by the processor 710 cause the processor to execute any of the methods mentioned above. The memory unit 720 may also store information that represents the mesh as well as costs of intermediate allocations that are calculated and evaluated during the execution of any of the methods mentioned above.

FIG. 8 illustrates various meshes and various cuts according to an embodiment of the invention.

Image 810 illustrates a mesh that is segmented to two parts while image 820 illustrates the mesh that is segmented to seven parts—as the segmenting method was applied multiple times.

Image 830 illustrates an initial cut 831 that was obtained after applying a first phase of method 100 and image 840 illustrates a much better cut 841 that was obtained after applying the second phase of method 100.

The segmentation process illustrated in this specification provides a highly accurate and automatic segmentation that is capable of segmenting three dimensional meshes in an accurate manner and may be applied on multiple three dimensional meshes in a reliable manner and to provide segmented three dimensional meshes.

The invention may also be implemented in a computer program for running on a computer system, at least including code portions for performing steps of a method according to the invention when run on a programmable apparatus, such as a computer system or enabling a programmable apparatus to perform functions of a device or system according to the invention. The computer program may cause the storage system to allocate disk drives to disk drive groups.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on a non-transitory computer readable medium. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Although specific conductivity types or polarity of potentials have been described in the examples, it will be appreciated that conductivity types and polarities of potentials may be reversed.

Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein may be designed as either negative or positive logic signals. Therefore, in alternate embodiments, those signals described as positive logic signals may be implemented as negative logic signals, and those signals described as negative logic signals may be implemented as positive logic signals.

Furthermore, the terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

I claim:

1. A non-transitory computer readable medium that stores instructions that once executed by a computer cause the computer to execute the stages of:
   receiving or generating a mesh, wherein the mesh is a three dimensional surface mesh that comprises multiple faces and represents a three dimensional object;
   calculating multiple costs associated with multiple intermediate allocations; and
   selecting an intermediate allocation of the multiple intermediate allocations in response to the multiple costs thereby providing a selected cut;
   wherein the calculating of the multiple costs comprises repetitively executing the following steps:
      calculating an intermediate allocation of the multiple faces between different intermediate parts of the mesh thereby defining an intermediate cut; wherein the intermediate allocation differs from a previous intermediate allocation by a change in an allocation of at least one border face of the multiple faces;
      calculating, using a cost function, a cost of the intermediate allocation; wherein the cost of the intermediate cut is responsive to a length of the intermediate cut, and a difference between areas of the different intermediate parts; and
      determining, based upon a comparison between a cost associated with the previous intermediate allocation and the cost of the intermediate allocation whether to accept the change in the allocation of the at least one border face.

2. The non-transitory computer readable medium according to claim 1 that stores instructions for selecting of the intermediate allocation by selecting the intermediate allocation of faces that is associated with a best cost out of the multiple costs.

3. The non-transitory computer readable medium according to claim 1 wherein the cost of each intermediate allocation is responsive to (a) a length of an intermediate cut defined by the intermediate allocation and (b) a sum of a reciprocal of an area of a first intermediate part defined by the intermediate allocation and a reciprocal of an area of the second intermediate part first intermediate part defined by the intermediate allocation.

4. The non-transitory computer readable medium according to claim 3 wherein the cost of each intermediate allocation is proportional to a product of a multiplication between (a) the length of the intermediate cut defined by the intermediate allocation and (b) a square root the sum of the reciprocal of the area of the first intermediate part defined by the intermediate allocation and the reciprocal of the area of the second intermediate part defined by the intermediate allocation.

5. The non-transitory computer readable medium according to claim 1 that stores instructions for accepting a change in a certain intermediate allocation of at least one border face only when the change is beneficial.

6. The non-transitory computer readable medium according to claim 1 that stores instructions for accepting a change in a certain intermediate allocation of at least one border face when the change is beneficial and when the change is disadvantageous below a disadvantage threshold.

7. The non-transitory computer readable medium according to claim 1 that stores instructions for applying a probabilistic process for accepting a change in a certain intermediate allocation of at least one border face when the change is disadvantageous.

8. The non-transitory computer readable medium according to claim 7 that stores instructions for reducing a probability of success in the probabilistic process over time.

9. The non-transitory computer readable medium according to claim 1 that stores instructions for stopping the calculation of the multiple costs when all changes in allocations of border faces are rejected.

10. The non-transitory computer readable medium according to claim 1 wherein at least one intermediate allocation is calculated by changing an allocation of only a single border face of a corresponding previous intermediate allocation.

11. The non-transitory computer readable medium according to claim 1 wherein at least one intermediate allocation is calculated by changing an allocation of a plurality of border faces of a corresponding previous intermediate allocation.

12. The non-transitory computer readable medium according to claim 1 wherein at least one intermediate allocation is calculated by changing an allocation of only a single border face of a corresponding previous intermediate allocation; and wherein at least one other intermediate allocation is calculated by changing an allocation of a plurality of border faces of a corresponding previous intermediate allocation.

13. The non-transitory computer readable medium according to claim 1 wherein the calculating of the multiple costs comprises a first phase and a second phase that follows the first phase;
   wherein during the first phase each intermediate allocation is calculated by changing an allocation of only a single border face of a corresponding previous intermediate allocation; and
   wherein during the second phase each intermediate allocation is calculated by changing an allocation of a plurality of border faces of a corresponding previous intermediate allocation.

14. The non-transitory computer readable medium according to claim 1 wherein the selected cut defines multiple selected parts; wherein the non-transitory computer readable medium stores instructions for segmenting a selected part by calculating multiple costs associated with multiple intermediate allocations of the selected part; and selecting an intermediate allocation of selected part out of the multiple intermediate allocations of the selected part in response to the multiple costs thereby providing an additional selected cut.

15. A non-transitory computer readable medium that stores instructions that once executed by a computer cause the computer to execute the stages of:
   receiving or generating a mesh, wherein the mesh is a three dimensional surface mesh that comprises multiple faces and represents a three dimensional object; and
   finding a first cut that segments the mesh to a first part and a second part;
   wherein the finding of the first cut comprises applying an iterative process that comprises:
      calculating, by applying a cost function, multiple costs associated with multiple intermediate cuts that result from multiple different allocations of faces of a set of faces of the mesh to multiple intermediate first and second parts; and selecting the first cut in response to values of the multiple costs;

wherein a cost of a certain intermediate cut that represents a certain allocation of faces between certain intermediate first and second parts is responsive to (a) a length of the certain intermediate cut, and (b) a difference between areas of the first and second intermediate parts.

16. The non-transitory computer readable medium according to claim 15 wherein the selecting of the first cut comprises selecting the certain allocation of faces that provides a best cost out of the multiple costs.

17. The non-transitory computer readable medium according to claim 16 wherein the cost of the certain intermediate cut is responsive to (a) the length of the certain intermediate cut and (b) a sum of a reciprocal of the area of the first intermediate part and a reciprocal of the area of the second intermediate part.

18. The non-transitory computer readable medium according to claim 17 wherein the cost of the certain intermediate cut is proportional to a product of a multiplication between (a) the length of the certain intermediate cut and (b) a square root the sum of the reciprocal of the area of the first intermediate part and the reciprocal of the area of the second intermediate part.

19. A non-transitory computer readable medium that stores instructions that once executed by a computer cause the computer to execute the stages of:

receiving or generating a mesh, wherein the mesh is a three dimensional surface mesh that comprises multiple faces and represents a three dimensional object;

calculating multiple costs associated with multiple intermediate allocations; wherein the multiple costs are calculated by applying a cost function; wherein each intermediate allocation is defined by an intermediate cut that segments the mesh to multiple segments; wherein the cost of each intermediate allocation is responsive to a product of a length of an intermediate cut defined by the intermediate allocation and to a sum of a reciprocal of an area of a first intermediate part defined by the intermediate allocation and a reciprocal of an area of the second intermediate part first intermediate part defined by the intermediate allocation; and selecting an intermediate allocation of the multiple intermediate allocations that has a best cost thereby providing a selected cut.

* * * * *